United States Patent [19]
Corbett

[11] Patent Number: 4,568,522
[45] Date of Patent: Feb. 4, 1986

[54] SYNFUEL PRODUCTION SHIP

[75] Inventor: Marshall J. Corbett, East Northport, N.Y.

[73] Assignee: Grumman Aerospace Corporation, Bethpage, N.Y.

[21] Appl. No.: 417,309

[22] Filed: Sep. 13, 1982

[51] Int. Cl.$^4$ ............................................. B01J 19/08
[52] U.S. Cl. ................................ 422/186; 114/65 A; 114/270; 422/189; 422/190; 422/234
[58] Field of Search .............. 422/189, 190, 186, 234; 114/1, 7, 65 A, 264, 270; 518/702, 713, 704

[56] References Cited
U.S. PATENT DOCUMENTS 3,498,249 3/1970 Jones ................................ 114/65 A
4,011,826 3/1977 Yee .................................... 114/65 A
4,282,187 8/1981 Corbett et al. ...................... 422/190

OTHER PUBLICATIONS

Meyer, "German Concrete Shipbuilding During the War", Fiat Report No. 844, Jul. 1946.

Primary Examiner—Peter Kratz
Attorney, Agent, or Firm—Pollock, VandeSande & Priddy

[57] ABSTRACT

A vessel, vehicle or aircraft is self-equipped with means for producing and storing synthetic fuel generated from the synthesis of carbon dioxide and hydrogen. Energy for the synthetic fuel production is obtained from an on-board nuclear reactor.

2 Claims, 7 Drawing Figures

| SYN. GAS COMPONENT | PROCESS & EQUATION | EQUIPMENT |
|---|---|---|
| (a) HYDROGEN | ELECTROLYSIS OF WATER $2H_2O \xrightarrow{e} 2H_2 + O_2$ | ELECTROLYTIC CELLS |
| (b) CARBON DIOXIDE<br>— SODIUM HYPOCARBONATE & SODIUM BICARBONATE | $CO_2$ ABSORPTION<br>$2NaOH + CO_2 \rightarrow Na_2CO_3 + H_2O$<br>$CO_2 + Na_2CO_3 + H_2O \rightarrow 2NaHCO_3$ | SPRAY ABSORPTION TOWERS |
| (c) — CARBON DIOXIDE | $CO_2$ STRIPPING<br>$Na_2CO_3 + Cl_2 \rightarrow 2NaCl + NaOCl + CO_2$<br>$2NaHCO_3 + Cl_2 \rightarrow 2NaCl + NaOCl + 2CO_2 + H_2O$ | STRIPPING TOWER |
| (d) — SODIUM CHLORIDE | OXYGEN SEPARATOR<br>$2NaOCl \xrightarrow{\Delta} 2NaCl + O_2$ | BOILER |
| (e) — CAUSTIC/CHLORINE | CHLOR-ALKALI ELECTROLYSIS<br>$2H_2O + 2NaCl \xrightarrow{e} 2NaOH + Cl_2 + H_2$ | ELECTROLYTIC CELLS |
| (f) METHANOL | $CO_2 + 3H_2 \rightarrow CH_3OH + H_2O$ | METHANOL SYN. |
| (g) GASOLINE | $n\,CH_3OH \rightarrow (CH_2)_n + nH_2O$ | HYDROCARBON SYN. |

FIG. 2

SYNFUEL PRODUCTION SHIP

FIELD OF THE INVENTION

The present invention relates to synthetic fuel production and more particularly to a transportation medium such as a vessel, vehicle or aircraft that manufactures and stores such synthetic fuel on-board.

BRIEF DESCRIPTION OF THE PRIOR ART

A severe logistics problem is developed by a naval fleet or an air force airlift operation which consumes vast quantities of fuel for ships and aircraft. Consequently, for operations far removed from home base, long supply lines of fuel-laden tankers are a necessity. Not only does this situation require a large number of tankers which themselves burn fuel, but ocean-going supply lines are quite vulnerable to enemy attack. Accordingly, a tremendous need exists for a vessel which forms part of the fleet and which can by itself provide the fuel necessary for the fleet and for airlift return.

The production of synthetic fuels at the site of the fleet or any large scale military operations abroad would be a solution but currently, synthetic fuel production capabilities require large refineries wherein raw materials must be provided for conversion. Further, large quantities of power are required to produce synthetic fuels. Accordingly, the establishment of a production capability within the fleet for synthetic fuels is not possible by the prior art.

BRIEF DESCRIPTION OF THE PRESENT INVENTION

The present invention is a particular application of the invention taught in U.S. Pat. No. 4,282,187 and related divisional patent application Ser. No. 167,075, which matured to U.S. Pat. No. 4,339,547 on Jul. 13, 1982, all of which are assigned to the present assignee. In the previous application, a system and related process are described for producing synthetic hydrocarbons from the synthesis of $CO_2$ obtained from environmental sources such as the atmosphere and water. An intermediate fuel, namely methanol, is first produced and then upgraded to gasoline by a terminal catalytic step. The previous patent mentions the potential use of the system and process set forth therein for shipboard use.

The present invention is directed to a shipboard system which is capable of producing synthetic fuel in accordance with the previous patent.

In order to achieve the synthetic fuel production, absorption towers must be located on deck and inclined toward the bow of the ship so that airflow through the absorption tower is increased. Further, in order to obtain the high amounts of electrical energy necessary for the process, nuclear reactors are used.

In order to increase the attack resistance of a military ship, built in accordance with the present invention, a concrete wall is formed inwardly of the outer hull so that penetration by missiles is difficult.

In accordance with the present invention, a "factory" ship is obtainable which may form part of a naval fleet and which is completely self-contained so that it can produce fuel for the fleet without requiring access to a supply line.

It is anticipated that, although the present invention is primarily addressed toward a shipboard application, it is envisioned as being equally applicable to vehicle and aircraft applications as well.

The above-mentioned objects and advantages of the present invention will be more clearly understood when considered in conjunction with the accompanying drawings, in which:

BRIEF DESCRIPTION OF THE FIGURES

FIG. 2 is a table detailing the chemical reactions which occur at each step of the synthetic fuel production process.

DETAILED DESCRIPTION OF THE INVENTION

Synfuel production on the ship of this invention utilizes the chemistry disclosed in the aforementioned patent and application. As set forth therein, there is fixation of the $CO_2$ present in the atmosphere (0.33 percent by volume) by the interaction of a weak base with the carbonic acid formed by the presence of $CO_2$ in moisture. This is a rather fast reaction resulting in the mixed salts of sodium bicarbonate ($Na_2CO_3$) and hypo carbonate ($NaHCO_3$) in a water solution. Alternately, the $CO_2$ may also be derived from sea water. This may be accomplished by conventional fractional distillation of the water to separate the $CO_2$ from other gases absorbed in the water. $CO_2$ constitutes approximately $0.1 \times 10^{-3}$ gm/cc by weight of sea water.

Figure 1:
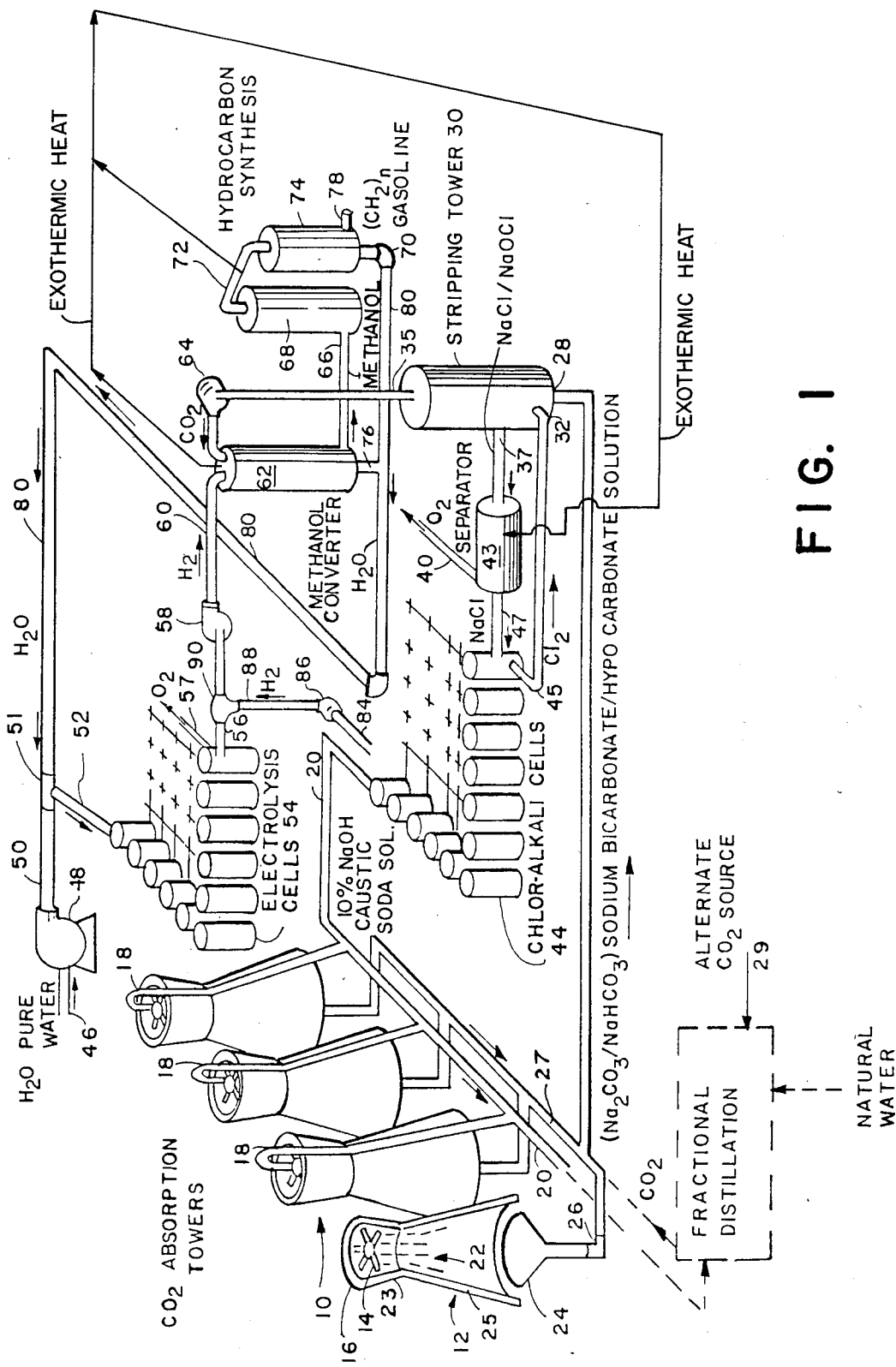
FIG. 1 is a mechanical schematic diagram of the system for producing synthetic fuel.
Figure 3A:
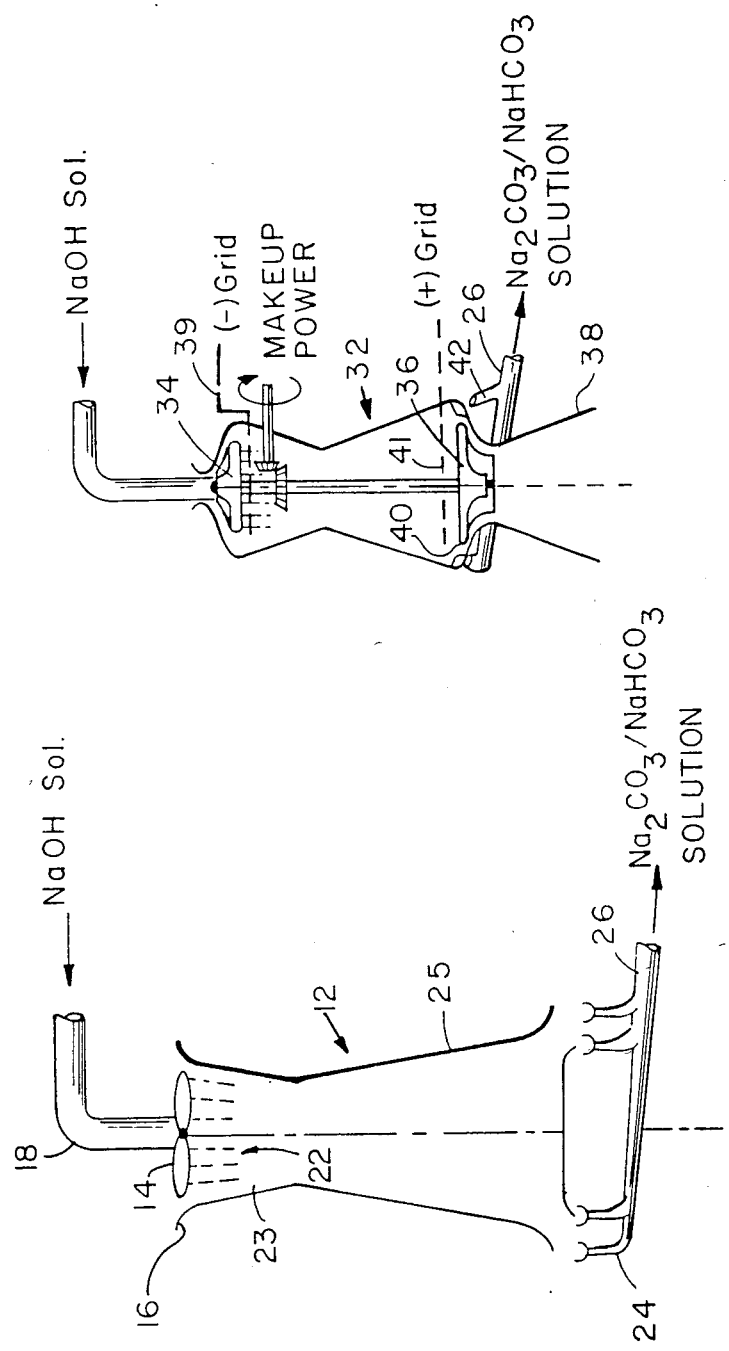
FIG. 3a is a mechanical schematic view of the basic internal structure of a first type of $CO_2$ absorption tower which may be used in the present invention.
Figure 4A:
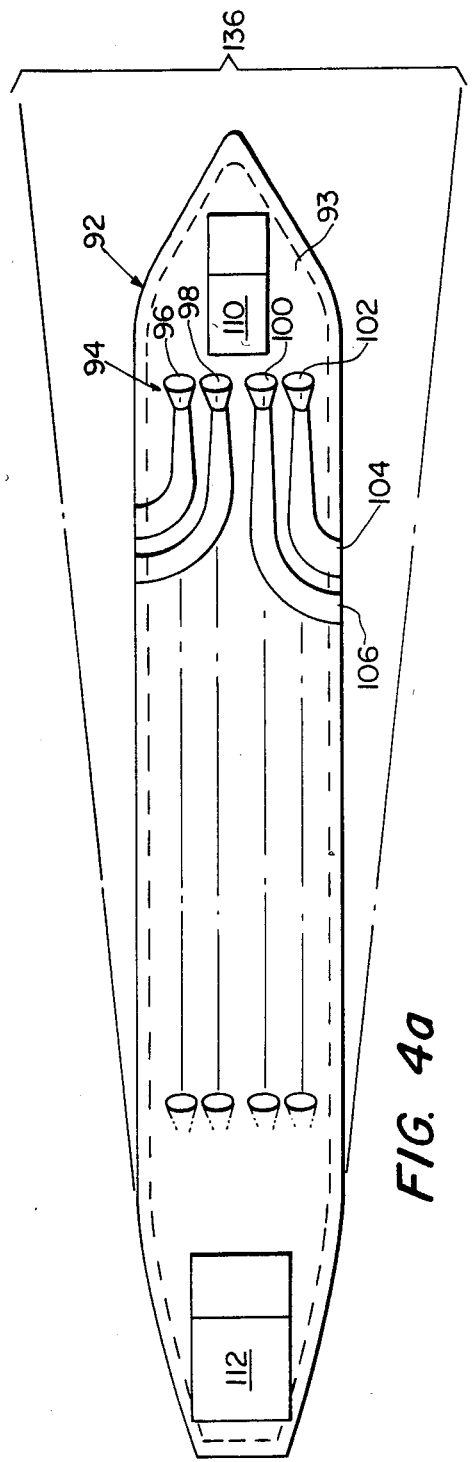
FIG. 4a is a schematic top plan view of a vessel equipped with deck mounted absorption towers in accordance with the invention.
Figure 4B:
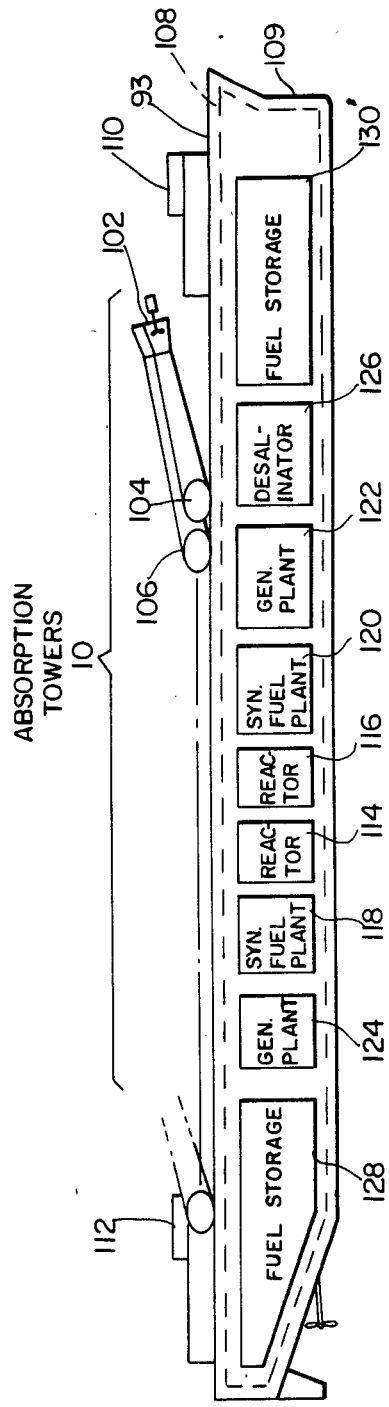
FIG. 4b is a schematic diagram of a vessel equipped with the present invention.

Referring to FIG. 1, the preferred method for obtaining the mixed salts of sodium bicarbonate and hypo carbonate is schematically shown. A number of $CO_2$ absorption towers, generally indicated by reference numeral 10, are characterized as frustoconical constructions. The disposition of these towers on the deck of a ship is shown in FIGS. 4a and 4b and will be explained hereinafter. FIGS. 1 and 3a show tower 12 in a cutaway view illustrating a fan 14 positioned at the upper inlet 16 of the tower. Pipes 18 are respectively connected to each of the tower fans and supply a 10 percent caustic soda solution (NaOH) to a respective fan 14 which has holes (not shown) in its blade structure for changing the state of the caustic soda solution to droplets 22, within the interior of each tower. The caustic soda solution is fed to the towers 10 by a common supply pipe 20. During operation of the illustrated system in FIG. 1, air is induced to enter the top of each tower by the fan which is preferably electrically driven and which provides an axial flow through the tower. The droplets 22 of the NaOH solution are accelerated through a venturi 23 to promote mixing, and are then decelerated in a diffuser section 25 to relatively low velocities in order to avoid misting. The resulting $Na_2CO_3/NaHCO_3$ solution droplets are collected on a splashplate 24 at the base of the tower and are pumped through outlet pipe 26 to a common collection pipe 27 for all the towers. The base solution is then fed to inlet 28 of a $CO_2$ stripping tower 30 which may be a conventional bubble tower. The $Na_2CO_3/NaHCO_3$ solution may also be derived by supplying $CO_2$ from sea water instead of using the absorption towers. As previously mentioned, the $CO_2$ component may be derived by fractional distillation apparatus 29. The chemical equation expressing the reaction between the NaOH caustic soda solution and the $CO_2$ derived from air or water is expressed in the table of FIG. 2 line (b).

By way of example, the absorption tower 12 shown in FIG. 3a may typically be 180 feet in height and 40 feet in diameter at the upper inlet 16. The diffuser 25 may be configured at 6 degrees while the airflow will equal 10–50 feet per second with a resulting "through-put" of 6.75 million standard cubic feet per minute per tower. An improvement upon the simple one atmosphere tower described above can be made by increasing the pressure within the tower to several atmospheres, since reaction rates of this type improve linearly with pressure. Viewing FIG. 3b, the electric motor fan may be replaced with a single stage compressor, and the tower's dimension foreshortened in direct proportion to the pressure ratio of that compressor. In order to power the compressor, an expander (turbine) is added to the base of the tower, which might also serve as a centrifugal droplet separator. Since neither the compressor nor the expander is 100 percent efficient, make-up power will have to be provided to the shaft connecting the two. Frusto-conical tower 32 is seen to include a conventional compressor blade assembly 34 which, like the fan 14, has holes or openings (not shown) drilled therein which distribute the NaOH solution as droplets within the interior of the tower. The mentioned expander is shown by turbine blade assembly 36 located at the outlet of the tower 32. With the proper choice of dimensional specifications, the pressure drop in the tower 32 may be as great as four atmospheres and the flow rate through the tower will be comparable to that of the embodiment shown in FIG. 3a, namely, 10–50 feet per second. In order to step down the pressure in the tower 32, a frustoconical diffuser 38 is shown communicating with the lower outlet end of tower 32. A lower end of the diffuser 38 vents to the atmosphere. As droplets fall toward the lower outlet of tower 32, they impinge upon the turbine blade assembly 36 and a centrifugal effect forces droplets collecting on the turbine blade assembly to the lower sidewalls of the tower 32 and thereafter through the openings 40 to splashplate 42. The outlet pipe 26 collects the $Na_2CO_3$ solution as previously described in connection with FIGS. 1 and 3a.

Figure 3B:
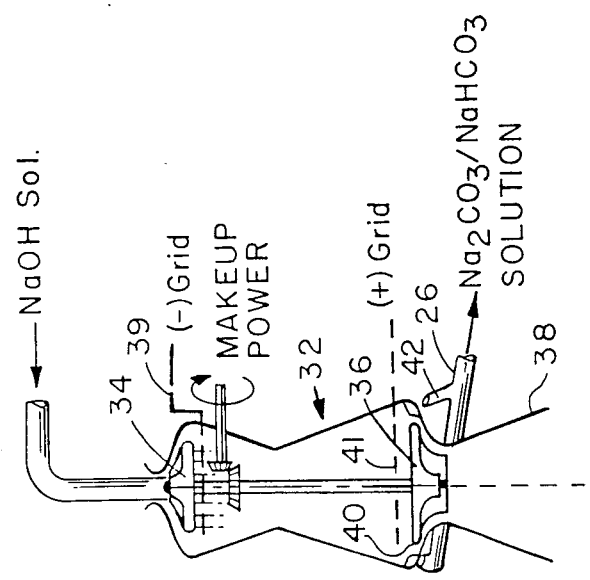
FIG. 3b is a mechanical schematic view of the basic internal structure of a second embodiment of a $CO_2$ absorption tower.

A still further improvement conceived for the present invention which may reduce the size and improve the collection efficiency of a tower would be obtained through the use of ion attraction similar to those employed in smoke stack scrubbers common in combustion power plants and diagrammatically shown in FIG. 3b. Such a technique would customarily involve the imparting of an electrical charge, at a grid 39 to the NaOH solution droplets at the inlet to the tower, the opposite charge being imparted to the collection grid 41 at the outlet end of the tower. Such a technique might allow the droplets to move through the tower at higher speeds and still permit 100 percent recovery of the $Na_2CO_3/NaHCO_3$ solution.

In order to enhance the mixing of the NaOH droplets with air in a $CO_2$ absorption tower, cyclonic techniques may be employed. Such cyclonic techniques have the additional advantage of coalescing the droplets of $Na_2CO_3/NaHCO_3$ solution by centrifugal action imparted by a cyclonic fan structure. The apparatus for carrying out such a cyclonic technique may be of the type disclosed in U.S. Pat. No. 4,070,131 to Yen, assigned to the assignee of the present application. In order to reduce the height of the tower and still maintain good pressure recovery, the diffuser outlet angle of the $CO_2$ absorption tower can be increased from a normal 6 degrees to 15 degrees or more by incorporating, within the interior of a tower, a wind turbine as disclosed in U.S. Pat. No. 4,075,500 to Oman et al and assigned to the assignee of the present application.

Referring once again to FIG. 1, the purpose of the stripping tower 30 is to catalytically remove $CO_2$ from the solution through the action of chlorine ($Cl_2$) on the solution. The requisite chlorine is supplied to tower 30 at tower inlet 32. $CO_2$ is drawn from the tower 30 through outlet pipe 35. The resulting solution is brine which flows from the tower 30 through pipe 37 to an oxygen separator 43 (boiler) which heats the NaCl (salt) and NaOCL in solution to cause the oxygen to vent to the atmosphere at outlet pipe 40. A pure NaCl solution (brine) results. One of the sources for heat, required by the $O_2$ separator 43 may be derived from the methanol and/or gasoline synthesis reactors explained in detail hereafter. The chemical equation relating to the $CO_2$ stripping tower 30 is shown on line (c) of FIG. 2, while the reaction of the oxygen separator is shown on line (d) of FIG. 2.

The brine solution is then pumped through the outlet pipe 47 to a battery of standard chlor-alkali cells 44 (Hooker cells) where electrical current is applied to produce $H_2$ at each cathode and $Cl_2$ at each anode. Such cells are available from Allied Chemical Company. The chemical equation representing the reaction in the cells 44 is represented by line (e) of the table shown in FIG. 2. As will be seen from the equation, a byproduct solution in the form of caustic soda (NaOH) results. This solution is piped back to the absorption towers 10 through pipe 20. Another byproduct from the cells 44 is $Cl_2$ which is fed back to the $CO_2$ stripping tower 30 through feedback pipe 45.

In order to complete the process, $H_2$ must be generated. This is accomplished when pure water is provided at inlet pipe 46 to pump 48 and thereafter to supply pipe 50 where a coupling 51 diverts the water flow to the electrolysis cells 54 via connecting pipe 52. The water provided in pipe 46 may be derived from sea water which is first desalinized in accordance with known techniques which do not, per se, form a part of the present invention.

The electrolysis of distilled or fresh water to produce $H_2$ and $O_2$ is well-known art, practiced most frequently in nuclear submarines where breathing oxygen is obtained from such electrolysis. Appropriate electrolysis cells are comprised of a solid polymer electrolyte as developed by General Electric Company and disclosed in the General Electric publication by L. J. Nutall entitled "Production and Application of Electrolytic $H_2$ Present and Future," Apr. 6, 1979. At the outlet pipe 56 of the battery of cells is a vent outlet 57 from which the $O_2$ electrolysis component is vented to the atmosphere. A compressor 58 compresses the $H_2$ electrolysis component from the electrolysis cells 54 and delivers it to a first inlet of the previously mentioned prior art methanol converter 62. A compressor 64 compresses the $CO_2$ delivered from the $CO_2$ stripping tower 30 and both these gases, which have been compressed to a typical pressure of 100 atmospheres (1500 psi), are admitted to the methanol converter 62 which contains a copper catalyst which accelerates the combination of the two streams of gases to produce methanol (methyl alcohol - $CH_3OH$).

The $H_2$ derived from the chlor-alkali cells 44 is delivered to compressor 86 via supply pipe 84 and thereafter through connector pipe 88 to the T-connector 90. At this point, $H_2$ resulting from the chlor-alkali cells is added to the $H_2$ resulting from the electrolysis of $H_2O$ from the electrolysis cells 54 for ultimate delivery to the methanol converter 62. The chemical reaction resulting from the catalytic process in converter 62 is represented by step (f) of the table shown in FIG. 2.

The methanol derived from converter 62 flows through pipe 66 for collection as an end product or for subsequent hydrocarbon synthesis by the prior art technique previously mentioned. In brief, the synthesis begins in catalytic reactor vessel 68 which contains the catalyst Zeolite. A resulting hydrocarbon liquid is then transferred through pipe 72 to a second separator vessel 74 which extracts water at outlet 70 and produces a synthetic hydrocarbon $(CH_2)_n$ at 78. The average molecular weight of these is dependent upon the pore size of the catalyst and/or the temperature/pressure level. Therefore, liquid products ranging from the "light" gasolines to "intermediate" kerosenes, and possibly even "heavier" heating oil can be synthesized. Thus, it is intended that the present invention satisfy the equation shown in line (g) of FIG. 2 where n ranges between approximately 4 and 10. The water extracted during the hydrocarbon synthesis is transferred from the outlet 70 of vessel 74 to supply pipe 80. This water is added to the water extracted at the outlet 76 of methanol converter 62 and is further added, at the coupling 51, to the water, fed to the electrolysis cells 54, externally through supply pump 48. Thus, the system recycles a portion of its water requirement. This is quite important for the present shipboard application where fresh water is difficult to obtain.

A simplification to the described system may be accomplished by combining the stripping tower 30, oxygen separator 43 and chlor-alkali cells 44 into a multi-chambered reactor which eliminates external chlorine piping.

The hydrocarbon synthesis is an exothermic reaction and in regions of the world where air temperatures are low and freezing of the weak caustic soda solution at the inlet of towers 10 would become a problem, the application of the exothermic waste heat to the incoming air would overcome the problem. It should be noted that the methanol conversion also generates waste heat which would be available for this purpose. The $O_2$ separator 43 requires heat which could be derived from either or both the hydrocarbon synthesis or the methanol conversion. The transfer of heat from these sources to either the towers or the $O_2$ separator would involve conventional heat transfer technology such as the use of radiators or heat pipes.

It will further be noted that once the cycle of the system illustrated in FIG. 2 begins, there is little need to add caustic soda and/or chlorine. If there is any need for make-up of these chemicals, sea water can be desalinized to produce NaOH and chlorine.

In order to accomplish the process constituting the invention, significant amounts of low-cost electrical power must be consumed, because it is conservatively estimated that the cycle efficiency (energy as compared with potential energy out) is between 25 and 37 percent. With improvements in electrolysis cell efficiency and cycle refinement, overall efficiencies as high as 50 percent are foreseen. Electrical energy must be supplied to the fans 14 of the towers 10 as well as to the electrolysis cells 54 and the chlor-alkali cells 44. Additional power is consumed by the pumps and compressors illustrated in FIG. 1. Electrical power from nuclear reactors is employed for a shipboard system for synthesis of hydrocarbons, as will be explained hereinafter.

The Shipboard System

FIGS. 4a and 4b schematically illustrate the utilization of the described synthetic fuel production to shipboard applications. By virtue of the present invention, it is possible for a "synfuel factory" ship to produce fuel and store it for utilization by other ships or for transportation to a remote location.

The schematically illustrated ship is generally indicated by reference numeral 92 and is seen to include a plurality of absorption columns generally indicated by 10 (FIG. 4b) arranged in rows such as 94 in FIG. 4a. In the illustration of FIG. 4b, nine rows of absorption towers are illustrated for the sake of example. Greater productivity can be achieved by filling the area of deck 93 with absorption towers.

Concentrating on FIG. 4a, absorption tower row 94 may, for example, include four absorption towers 96, 98, 100 and 102 transversely aligned across the bow of ship 92. As seen in FIG. 4b, the towers are inclined toward the bow of the ship so that airflow is increased as the ship moves forward. Exhaust orifices 104 and 106 terminate the airflow through respective absorption towers 102 and 100. These orifices are staggered longitudinally as indicated in FIG. 4b.

In the event ship 92 is to be a military vessel, an internal concrete wall 108 on the inside of the outer hull 109 provides protection against missile attack. Inasmuch as the interior of the ship includes a considerable amount of open volume, the ship may assume a proper draft even with the concrete wall.

Figure 5:
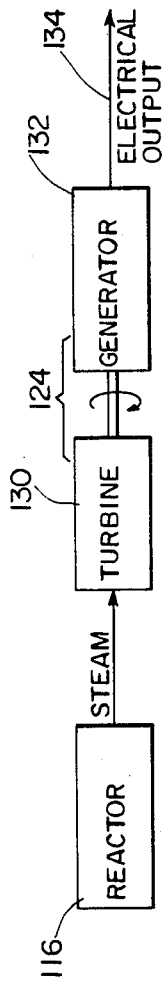
FIG. 5 is a schematic block diagram of an electrical system used in the present invention.

The large quantity of electrical energy required to achieve the synthetic fuel production is derived from nuclear reactors. For purposes of illustration, two such reactors are indicated at 114 and 116 in FIG. 4b. Each reactor cooperates with a respective generator plant 124, 122 to produce electricity. FIG. 5 illustrates reactor 116 producing steam for generator plant 124 which includes a steam-driven turbine 130 that drives a generator 132 having an electrical output 134 that is distributed where needed for synthetic fuel production as well as for powering the ship drive. The indicated reactor is of a conventional type used by public utilities. One such reactor is manufactured by General Atomics Corporation of San Diego, California. The steam turbine and generator set are of a conventional type used by electrical utilities. Typically, each reactor-generator plant is capable of producing 860 Meg. Watts of electricity. Electricity generated by generator plants 124 and 122 respectively power the synthetic fuel plants 118 and 120 which includes the apparatus connected to the absorption towers 10, as shown in FIG. 1.

A conventional seaboard desalinator 126 is employed to provide pure water for general shipboard consumption as well as for providing the pure water necessary in the synthetic fuel plants. The interior of the ship may be provided with fore and aft fuel storage tanks 128 and 130'. Above deck, a pilot house 110 is situated in front of the towers while living quarters for the crew may be provided at the ship's stern as indicated by 112.

As the ship moves forward, the intake of all absorption towers 10 generates a tapered elipsoid air stream tube, the bounds of which are indicated by 136. Essentially, this constitutes an air capture volume which typically may have a 420 foot diameter at the bow of the ship. This, according to calculations, would produce 270 million CFM of airflow with a ship speed of 17 knots. As to production, it has been estimated that a ship in accordance with the present invention will produce approximately 600,000 gallons of gasoline per day.

Accordingly, as may be appreciated, a significant synthetic fuel production is realizeable by utilizing the synthetic fuel producing ship of the present invention. By having such a "factory" ship in a naval fleet, it is possible to supply the fuel requirements of ships in the fleet and all associated military activities including airlift to remote areas thereby eliminating or alleviating long oceanic supply logistics. Commercially, such a ship may be utilized to produce fuel while en route for delivery to a distant port.

It is anticipated that, although the present invention is primarily addressed toward a shipboard application, it is envisioned as being equally applicable to vehicle and aircraft applications as well.

It should be understood that the invention is not limited to the exact details of construction shown and described herein for obvious modifications will occur to persons skilled in the art.

I claim:

1. A ship for producing gasoline while sailing, comprising:
   a top deck;
   a plurality of absorption venturi towers arranged in a multiple row and column orientation and mounted along an extended area of the deck and inclined toward the bow to capture air in an ellipsoid tapered air stream tube as the ship moves forward, and having lower exhaust orifices extending perpendicularly of a ship's center line;
   means for delivering NaOH solution to the towers;
   means connected to the delivering means and located in the towers for forming droplets of NaOH solution and directing the droplets to pass through air, in the towers, thus causing $CO_2$ in the air to be absorbed by the solution which results in a carbonate solution of sodium bicarbonate/hypo carbonate;
   means communicating with the droplet forming means for receiving the carbonate solution and combining $Cl_2$ therewith for stripping $CO_2$ as a first byproduct from the carbonate solution and NaCl/NaOCl as a second byproduct;
   means connected to the stripping means for transferring the $CO_2$ to a methanol converter;
   electrolysis means for disassociating $H_2$ and $O_2$ from water provided to it;
   means connected to the electrolysis means for transferring the $H_2$ to the methanol converter;
   a hydrocarbon synthesizer connected to an outlet of the methanol converter for converting methanol to gasoline;
   boiler means connected to the stripping means for separating $O_2$ from the NaCl/NaOCl solution thereby resulting in a NaCl solution;
   chlor-alkali cell converting means connected to the boiler means for converting the NaCl solution to
   (a) $Cl_2$ which is recycled, by a first connecting means, to the stripping means, and
   (b) NaOH solution which is re-introduced, by a second connecting means, to the NaOH droplet forming means;
   nuclear reactor means for generating steam;
   means connected to the reactor means for converting the steam to electrical power; and
   output means for delivering the electrical power to the electrolysis means.

2. The ship set forth in claim 1 together with a concrete wall located internally of its outer hull for increasing the immunity of the ship from military attack.

* * * * *